US012759797B2

(12) United States Patent
Moulin et al.

(10) Patent No.: US 12,759,797 B2

(45) Date of Patent: Oct. 13, 2026

(54) ORDER PREPARATION SYSTEM, AND METHOD IMPLEMENTING THE SYSTEM

(71) Applicant: Exotec Product France, Croix (FR)

(72) Inventors: Romain Moulin, Lille (FR); Renaud Heitz, Villeneuve d'Ascq (FR)

(73) Assignee: Exotec Product France, Croix (FR)

( * ) Notice: Subject to any disclaimer, the term of this patent is extended or adjusted under 35 U.S.C. 154(b) by 189 days.

(21) Appl. No.: 18/944,407

(22) Filed: Nov. 12, 2024

(65) Prior Publication Data

US 2025/0162806 A1 May 22, 2025

(30) Foreign Application Priority Data

Nov. 16, 2023 (FR) .................................. FR2312548

(51) Int. Cl.

*B65G 1/04* (2006.01)
*B65G 1/137* (2006.01)
*G06Q 10/087* (2023.01)

(52) U.S. Cl.

CPC ......... *B65G 1/1378* (2013.01); *G06Q 10/087* (2013.01)

(58) Field of Classification Search

CPC ...... B65G 1/1378; B65G 1/0492; B65G 1/06; B65G 1/0485; G06Q 10/087; G06Q 10/08741

See application file for complete search history.

(56) References Cited

U.S. PATENT DOCUMENTS

| | | | | |
|---|---|---|---|---|
| 9,505,556 B2 * | 11/2016 | Razumov | ............. | B65G 1/0492 |
| 11,778,956 B2 * | 10/2023 | Lert, Jr. | ................. | A01G 9/022 47/83 |

(Continued)

FOREIGN PATENT DOCUMENTS

| | | |
|---|---|---|
| CA | 03214607 A1 | 10/2022 |
| CN | 209177372 U | 7/2019 |
| EP | 3619150 B1 | 12/2021 |

(Continued)

OTHER PUBLICATIONS

Preliminary Search Report and Written Opinion on the Patentability of the Invention issued on May 30, 2024, in corresponding French Patent Application No. 2312548, 14 pages.

(Continued)

*Primary Examiner* — Justin Holmes

(74) *Attorney, Agent, or Firm* — Maier & Maier, PLLC

(57) ABSTRACT

An order preparation system including, in a warehouse: a plurality of racks (Ra) each configured to receive storage units (U) intended for storing items, the racks arranged in a plurality of vertical planes, at least one order preparation zone (PC) arranged at a distance from the racks, a conveying facility configured to transport one or more storage units received in the racks to the at least one order preparation zone, in a first transport direction, or conversely to transport one or more storage units from the order preparation zone to the racks, in a second transport direction, the conveying facility successively including, along the first direction, three conveying systems (CV1, CV2, CV3), with vertically moving shuttles, a vertically moving elevator at the end of the rack, and self-guided trolleys moving about on a horizontal surface such as the floor or a platform having a rolling surface.

14 Claims, 4 Drawing Sheets

(56) References Cited

U.S. PATENT DOCUMENTS

| | | | |
|---|---|---|---|
| 2021/0395015 | A1 | 12/2021 | Ahammer et al. |
| 2023/0089547 | A1 | 3/2023 | Nako et al. |

FOREIGN PATENT DOCUMENTS

| | | | | | |
|---|---|---|---|---|---|
| FR | 3125515 | A1 | | 1/2023 | |
| JP | 2023097493 | A | * | 7/2023 | |
| WO | WO-2022207574 | A1 | * | 10/2022 | ............ B65G 1/137 |

OTHER PUBLICATIONS

Van Moergestel, et al., "A Simulation Model for Transport in a Grid-based Manufacturing System", INTELLI 2014: The Third International Conference on Intelligent Systems and Applications, 2014, pp. 1-7.

Ssi Schaefer Group, "Ergonomics and Impressive Picking Performance: Advanced Pick Station two-level", URL:https://www.youtube.com/watch?v=3grF0U5Y33Q&ab channel=SSISCHAEFERGroup, Feb. 3, 2023, 2 pages.

* cited by examiner

ORDER PREPARATION SYSTEM, AND METHOD IMPLEMENTING THE SYSTEM

This disclosure relates to an order preparation system comprising, in a warehouse: a set of storage racks receiving storage units for items, one or more order preparation stations, and a conveying facility configured to transport one or more received storage units stored in the storage racks, to said at least one order preparation zone, along a first transport direction, or conversely to transport one or more storage units from the order preparation zone to the storage racks, in a second transport direction.

This disclosure also relates to an order preparation method which implements the order preparation system according to the present disclosure.

TECHNICAL FIELD

The present disclosure falls within the general field of automated storage and retrieval systems known to those skilled in the art by the acronym ASRS.

BACKGROUND

Many ASRS solutions exist and are in use.

One of the known solutions consists of a set of storage racks resting on a floor and extending along vertical planes, with pairs of racks being separated by respective shelving aisles, as illustrated in FIG. 1. The storage racks receive storage units in their shelving, typically containers such as bins or trays, the storage units being stored and distributed along the length of the rack, along the shelving aisle, but also distributed atop one another to occupy the height of the rack.

Order preparation stations are arranged on the floor, at a distance from the storage racks, and are configured to receive storage units containing items for the preparation of an order, the storage units containing items being transported by a conveying facility comprising several successive automated conveying systems.

The conveying systems of this solution respectively comprise, in a first transport direction of the storage units which is from the storage rack to the order preparation stations:

- a first conveying system arranged in the shelving aisles, comprising first conveying devices which are independent of each other for the horizontal transport of storage units along said shelving aisle, the conveying devices respectively working at a plurality of heights of the storage rack, guided by horizontal rails,
- a second conveying system, typically arranged at the end of each shelving aisle, comprising at least one second conveying device guided by vertical rails, configured for the vertical transport of storage units from the first conveying system to a third conveying system in the first transport direction,
- the third conveying system which in particular comprises a set of physical conveyors, typically roller conveyors, anchored to the floor, winding continuously from the base of second conveying devices to the order preparation stations.

Using more common terminology, the first conveying system is similar to "shuttles". These "shuttles" are self-guided vehicles equipped with rolling means such as wheels, capable of traveling on rails. The rails are positioned in the aisles at different levels of the rack. Said "shuttles" also have means of gripping the bins or trays located in each of the cells of the rack. These are lateral gripping means on the sides of the shuttle, which allow the shuttle to load or unload the bins or containers it grabs.

The third conveying system is similar to a "transfer table". These are tables which, by means of mechanical devices such as rollers and belts, make it possible to route trays or bins from one point in the warehouse to another. The second conveying system is similar to an "elevator". It is located at the end of the racks. Its essential function is to raise a tray or bin from the floor to a rack tier level, or to lower a tray or bin from a rack tier level to the ground. At each rack tier level, it is able to cooperate with the first conveying system, i.e. with one of the shuttles described above. In other words, it is able to exchange a tray or bin with a shuttle in one transport direction or the other. Similarly, on the ground, it is able to cooperate with the second conveying system, i.e. with one of the transfer tables described above. In other words, it is able to exchange a tray or bin with a transfer table, in one transport direction or the other.

Such prior art is a commercial solution that has been in use for many years.

According to the inventor's findings, such a solution has the following deficiencies, however:

- the existence of a single point of failure which will result in complete shutdown of the system in the event of a breakdown, this single point of failure being linked to the presence of the aforementioned third conveying system
- no possibility of changing the sequence of the transported storage units arriving at the order preparation stations, namely the arrival sequence echoes the sequence in which the storage units are extracted from the storage racks,
- low scalability of the system, particularly if capacities need to be increased,
- a large footprint.

SUMMARY

The present disclosure improves the situation.

According to a first aspect, an order preparation system is proposed, comprising, in a warehouse:

- a plurality of racks (Ra) each configured to receive storage units intended for items, the racks being arranged in a plurality of vertical planes,
- at least one order preparation zone arranged at a distance from the racks,
- a conveying facility configured to transport one or more storage units received in the racks to said at least one order preparation zone, in a first transport direction, or conversely to transport one or more storage units from the order preparation zone to the racks, in a second transport direction, said conveying facility successively comprising, along the first transport direction:
  - a first conveying system which is arranged in a shelving aisle arranged between two adjacent racks, configured to transport storage units from at least one of the two racks comprising several first conveying devices arranged at a plurality of heights, said first devices being independent of each other for the horizontal transport of storage units along said shelving aisle,
  - a second conveying system, comprising at least one second conveying device configured for the vertical transport of storage units from the first conveying device to a third conveying system, in the first transport direction,
  - the third conveying system, configured for the transport of storage units from the second conveying system to said at least one order preparation zone, in the first transport direction, and wherein the third conveying system comprises a plurality of self-guided trolleys circulating in open space on a rolling surface of the warehouse, said self-guided trolleys comprising rolling means configured to ensure movement of the self-guided trolley along a horizontal plane of the rolling surface.

The features set forth in the following paragraphs may optionally be implemented, independently of one another or in combination with one another:

the rolling surface may be a rolling-surface platform which is raised, in whole or in part, relative to:

a floor of the warehouse on which the racks rest, such that vertical guide rails of said at least one second conveying device extend lower than the height of the rolling-surface platform, and/or a support surface, such as the floor, for an operator of the order preparation station, such that a portion of the edge of the platform, adjoining the support surface for the operator, allows parking one of the self-guided trolleys carrying a storage unit, in a raised manner relative to the support surface.

In particular, the support surface is a platform comprising a height adjustment mechanism configured to allow adjusting a difference in level between the rolling-surface platform and the support platform.

The system may comprise a transfer system configured to ensure, on the one hand, a transfer of the storage unit, in the first transport direction, from said at least one second conveying device which is therefore in a low position, to one of the self-guided trolleys parked in at least one transfer location near the second conveying device, and configured to ensure, on the other hand, a transfer of the storage unit, in the second transport direction, from one of the self-guided trolleys parked in said at least one transfer location, to the second conveying device.

Said at least one transfer location may comprise a first transfer location and a second transfer location, arranged one on either side of the second conveying device which is in said low position, and said transfer system is configured to perform, selectively:

a transfer of the storage unit between said second conveying device, in the low position, and a first self-guided trolley among said self-guided trolleys which is parked in the first transfer location, in particular in the first transport direction or respectively in the second transport direction, a transfer of the storage unit between said second conveying device, in the low position, and a second self-guided trolley among said self-guided trolleys which is parked in the second transfer location, in particular in the second transport direction or respectively in the first transport direction.

The transfer system is carried on board said at least one second conveying device and comprises a laterally movable portion configured to deploy the storage unit from a first position in which said storage unit is carried by a support of the second conveying device, to a lateral cantilevered position on the support in which said storage unit is moved to above one of the self-guided trolleys parked at said at least one transfer location.

According to one embodiment:

said at least one control station comprises several independent control stations which are accessible by the self-guided trolleys via the rolling surface, said at least one second conveying device may comprise a plurality of independent second conveying devices which are respectively associated with a plurality of shelving aisles, respectively serving the different racks, and the rolling surface and the self-guided trolleys are configured to supply each of the order preparation stations from storage units coming from various different second conveying devices.

According to one embodiment, the second conveying devices are exclusively and permanently positioned outside the shelving aisles and outside the storage racks.

According to one embodiment, said at least one second conveying device comprises, for each shelving aisle, a second conveying device associated with the first conveying devices of said aisle, said second conveying device being configured to travel vertically and being positioned outside said shelving aisle, preferably offset laterally relative to said shelving aisle in a direction transverse to said shelving aisle;

and each first conveying device is configured to travel in said aisle to a position outside said aisle, where said first conveying device is positioned adjacent to the second conveying device, in a transfer position;

and the order preparation system comprises a transfer system carried on board said first conveying device or said second conveying device, configured to allow a transfer of said storage unit from the first conveying device which is then in said transfer position, to the second conveying device, in the first transport direction.

In particular, the rolling surface, in particular the floor or the rolling-surface platform, extends between the order preparation stations and the storage racks, meaning that the rolling surface extends exclusively between the order preparation stations and the second conveying devices which are exclusively outside the storage racks and the shelving aisles, and such that the self-guided trolleys are configured to circulate exclusively outside the storage racks and shelving aisles.

According to a second aspect, an order preparation method is proposed for preparing at least one order comprising one or more items, making use of an order preparation system according to the present disclosure, the method comprising:

/A/ selecting one or more storage units among the storage units received in the racks, said storage unit(s) containing the item(s) of said at least one order, /B/ transporting said selected storage unit(s) to said at least one order preparation zone in the first transport direction, by:

/B0/ transferring the storage unit from a storage location in the rack to one of the first conveying devices, /B1/ conveying said unit via horizontal transport to the second conveying system by moving the first conveying device, /B2/ transferring the storage unit from the first conveying device to the second conveying device, /B3/ conveying said storage unit via vertical transport by moving the second conveying device to a low position, /B4/ transferring the storage unit from the second conveying device to one of the self-guided trolleys, /B5/ conveying said storage unit to said at least one order preparation zone, by moving the self-guided trolley in the open space.

According to one embodiment of the method according to the second aspect, in /B4/ the transfer of the storage unit to said self-guided trolley takes place while said trolley is parked in said first transfer location, and while another of the self-guided trolleys carrying another storage unit is parked in the second transfer location, the method successively comprising, in /B4/, the transfer of said other storage unit from the second transfer location to the second conveying device held in the low position, and said return of said other storage unit to one of the receiving locations of the rack by conveying the second conveying device via vertical transport, followed by conveying one of the first conveying devices via horizontal transport, said system comprising a transfer system, carried on board the first conveying device or second conveying device, configured to ensure a transfer of the storage unit from the first conveying device to the second conveying device.

According to one embodiment of the method according to the second aspect, said method may comprise a plurality of orders currently being prepared, the method comprising /C/ computerized identification of common items among the orders being prepared, these items being contained in a storage unit common to said orders being prepared which include a first order and an order subsequent to the first order, and after conveyance according to /B5/ by the self-guided trolley carrying the common storage unit to an order preparation zone for preparation of the first order, /D/ placing the self-guided trolley carrying the common storage unit on hold in a waiting area arranged in or near the preparation area, without returning the storage unit to the rack, so as to free said preparation area to receive at least one other storage unit conveyed according to /B5/ by another of the self-guided trolleys, said at least one other storage unit being necessary for the preparation of the first order or even of a second order, /E/ returning the self-guided trolley carrying said common storage unit, from the waiting area to the order preparation zone, for preparation of the subsequent order.

According to one embodiment of the order preparation system according to the first aspect, the self-guided trolleys are each equipped with a communication module configured to receive and send data wirelessly to and from a computerized remote control unit, and said remote control unit ensures the management and control of the conveying systems, which includes managing the guide paths of the self-guided trolleys on the rolling surface in order to ensure the transport of a storage unit from a storage location in the storage rack to said at least one order preparation station PC, said control unit comprising one or more processors, a memory, and a set of instructions configured for implementing the order preparation method according to the second aspect.

BRIEF DESCRIPTION OF DRAWINGS

Other features, details and advantages will become apparent from reading the detailed description below, and from analyzing the attached drawings, in which.

DETAILED DESCRIPTION

The present disclosure relates to an order preparation system comprising, in a warehouse:

- a plurality of racks Ra each configured to receive storage units U intended for items, the storage racks arranged relative to each other along a plurality of vertical planes,
- at least one order preparation zone PC arranged at a distance from the racks.

Generally, the storage units U may be containers for items, such as bins or trays.

Figure 2:
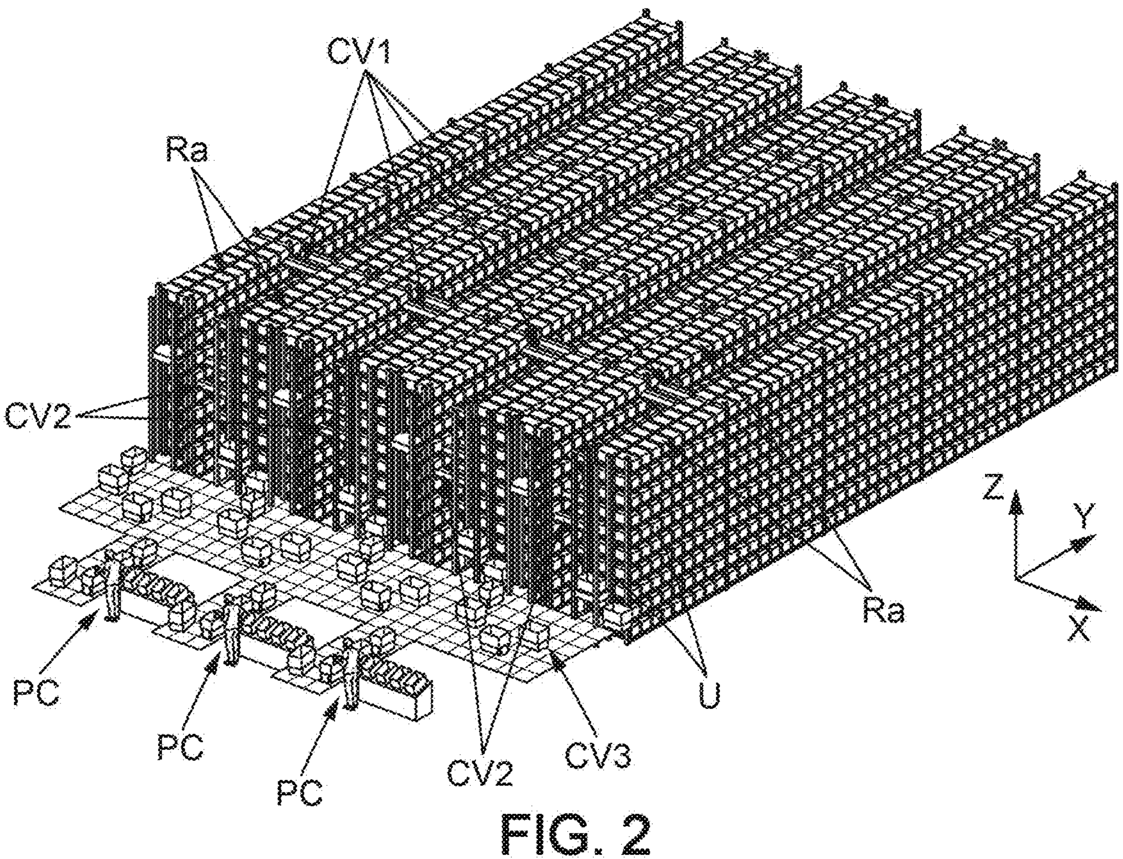
FIG. 2 is a schematic perspective view of a system according to the present disclosure, in particular comprising a third conveying system comprising a plurality of self-guided trolleys configured to travel in a first transport direction from second conveying devices to order preparation stations, or conversely in a second transport direction from each of the order stations to the second conveying devices.
Figure 3:
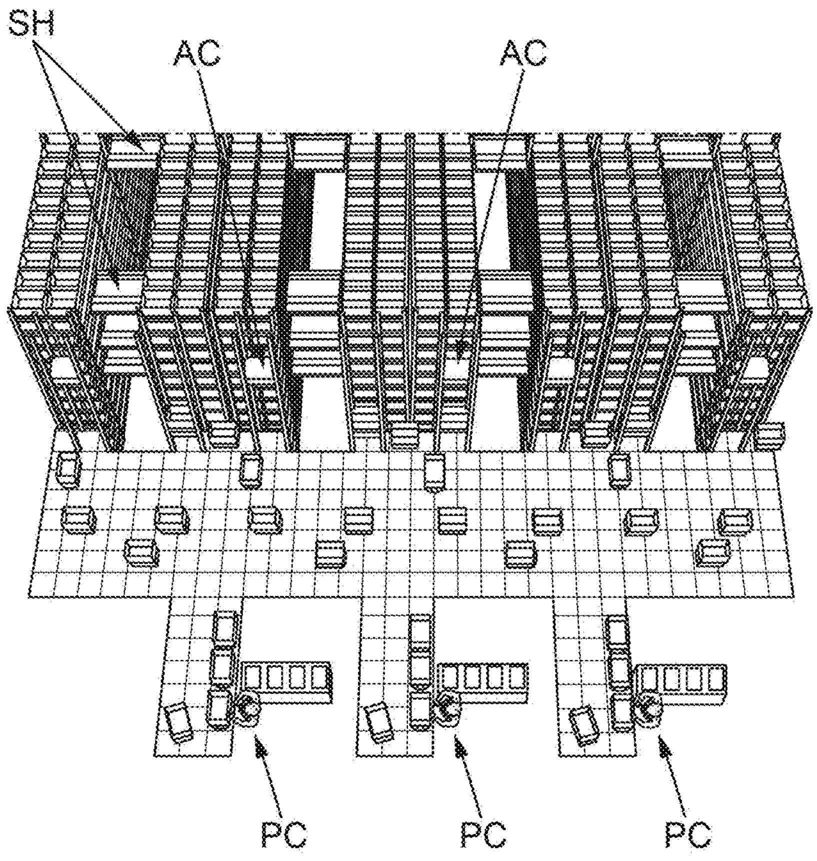
FIG. 3 shows two views, illustrating a top view of the system, illustrating from top to bottom: the first conveying devices in the shelving aisles, the devices distributed at three height levels; the vertically-moving second conveying devices at the end of the aisle; the rolling surface on which the self-guided trolleys travel; the order preparation stations adjoining an edge of the rolling surface formed by a platform that is raised relative to the floor, at the edge of which the operators prepare orders at the order preparation stations.

With reference to FIG. 2, and in general, the storage racks Ra may extend parallel to each other along vertical planes that are parallel to the YZ plane.

Storage racks Ra are spaced apart from each other by respective shelving aisles, in particular along the X direction in FIG. 2, namely along a direction transverse to the shelving aisles. The length of the aisles therefore extends along the Y direction, and the width along the X direction in FIG. 2. In general, storage racks Ra comprise storage locations for storage units U. The storage locations in storage rack Ra are distributed atop one another in the vertical direction, forming a column of storage locations which are superimposed, namely in the Z direction in FIG. 2, but also along the length of the storage rack, meaning the storage rack comprises a plurality of columns of storage locations which are distributed in the Y direction relative to each other.

In general, the storage locations of the racks are laterally open in the storage racks, towards said shelving aisles, meaning that the transfer of storage units into the storage locations during loading, or from said locations during unloading, takes place from the respective shelving aisles in a loading/unloading direction that is perpendicular to the vertical planes of the storage racks, namely along the X direction in FIG. 2.

In general, the storage racks may comprise a vertical structure formed by uprights or posts, typically in the form of metal profiles. The posts may be conventionally distributed:

- along the length of storage rack Ra, in particular along the Y direction in FIG. 2, and at a spacing corresponding at least to the width of the columns of superimposed storage locations,
- along the width of the storage rack, in particular along the X direction in FIG. 2, and at a spacing which typically may correspond to the depth of the storage locations, namely along the X direction, in FIG. 2.

The structure of storage rack Ra may typically also comprise a bracing system ensuring that the uprights/posts are held together. The storage locations may be physically represented by pairs of mechanical interfaces which face each other, typically brackets on which storage units U rest in the storage rack. Storage racks Ra typically rest on a floor of the warehouse, typically by their posts resting thereon, and typically may be anchored to the floor.

The order preparation system comprises a conveying facility configured to transport one or more storage units received in the storage racks to said at least one order preparation zone PC, in a first transport direction, or conversely to transport one or more storage units from the order preparation zone to the storage racks, in a second transport direction.

According to the present disclosure, said conveying facility may successively comprise, in the first transport direction:

- a first conveying system CV1 which is arranged in one of the shelving aisles, said aisle being arranged between two adjacent racks, the first conveying device being configured to transport storage units U from at least one of the two storage racks on either side of said shelving aisle, said racks comprising several first conveying devices SH arranged at a plurality of heights, said first conveying devices SH being independent of each other in the horizontal transport of storage units along said shelving aisle,
- a second conveying system CV2, comprising at least one second conveying device AC configured for the vertical transport of storage units from the first conveying system to a third conveying system, in the first transport direction,
- a third conveying system CV3, configured for the transport of storage units from the second conveying system to said at least one order preparation zone PC, in the first transport direction, and wherein the third conveying system comprises a plurality of self-guided trolleys CHR moving about in open space on a rolling surface of the warehouse, said self-guided trolleys comprising rolling means configured to ensure movement of the self-guided trolley along a horizontal plane of the rolling surface.

First conveying devices SH are arranged in the shelving aisles. First conveying devices SH of a shelving aisle are distributed at the different levels of the superimposed storage locations. A single conveying device SH is configured to load or unload the storage locations that are accessible from said shelving aisle, at the height level at which first conveying device SH is working, namely the storage locations of a storage rack arranged on a first side of said shelving aisle, and preferably also the storage locations arranged on a second side of said shelving aisle.

First conveying devices SH typically may respectively comprise motorized trolleys traveling parallel to each other in horizontal directions, and in particular parallel to the Y direction in FIG. 2. Each motorized trolley typically travels on guide systems, for example such as rails, respectively secured to two storage racks one on either side of the shelving aisle. Each motorized trolley is equipped with means of circulation, such as rolling means, for example wheels capable of cooperating with the aforementioned guide systems.

First conveying devices SH are devices that each travel along a single horizontal direction in said aisle. The motors of the trolleys are typically powered by a wired connection.

The first conveying devices may each comprise a (first) transfer system configured to ensure the transfer of a storage unit from a storage location on at least one side of the aisle, or preferably on both sides of said shelving aisle, until it is loaded onto the first conveying device, or conversely the transfer of a storage unit from first conveying device SH to a storage location in the storage rack, on at least one side of said shelving aisle or preferably on both sides of said shelving aisle. In other words, these first conveying devices are capable of exchanging a storage unit with the rack, in a direction perpendicular to the aisle in which they travel. In general, the transfer system of the first conveying devices may comprise a laterally movable portion configured to deploy storage unit U from a first position in which storage unit U is carried by a support of first conveying device SH, to a lateral cantilevered position on the support from which said storage unit is moved into a storage location in the rack, along direction X in FIG. 2.

Second conveying system CV2 comprises at least one second conveying device AC configured for the vertical transport of storage units U from the first conveying device to a third conveying system, in the first transport direction.

Said at least one second conveying device AC may comprise, for each shelving aisle, a second conveying device AC associated with first conveying devices SH of said shelving aisle.

Second conveying device AC is configured to travel in a vertical direction, and typically comprises a trolley traveling vertically, guided by vertical rails, typically along posts of second conveying system CV2. Each trolley of one of the conveying devices is configured to travel in a single vertical direction along the vertical rails.

Second conveying device AC is positioned outside said shelving aisle, preferably laterally offset relative to said shelving aisle, in a direction transverse to said shelving aisle, namely in direction X in FIG. 2.

Preferably, second conveying devices AC are exclusively positioned outside the shelving aisles and outside the storage racks, and preferably respectively as an extension of the longitudinal ends of the storage racks, as can be seen in FIG. 2, for example on one side of the rack system. Such positioning of second conveying devices AC, exclusively outside the storage racks, facilitates laying the electrical wiring of the trolleys, in particular those that supply electrical power to the motor controlling the vertical movement.

Each of first conveying devices SH is configured to travel in said shelving aisle to a position that is typically outside said shelving aisle, where said first conveying device SH is positioned next to second conveying device AC, in a position allowing a transfer between these two devices. In this transfer position, first conveying device SH and the second conveying device which thus are at the same height are side by side, offset in a direction transverse to said shelving aisle, namely in direction X in FIG. 2.

The order preparation system comprises a transfer system, which is typically carried on board first conveying device SH or second conveying device AC, configured to enable transferring storage unit U from first conveying device SH which is in said transfer position to second conveying device AC, in the first transport direction.

When carried on board first conveying device SH, the transfer system ensuring the transfer between first conveying device SH and second conveying device AC may be the same first transfer system that is used to ensure a transfer of the storage unit between (first) conveying device SH and one of the storage locations in storage rack Ra.

When carried on board second conveying device AC, the transfer system ensuring the transfer between first conveying device SH and second conveying device AC may be the same (second) transfer system that is used to transfer the storage unit between second conveying device AC and the third conveying system described below.

Third conveying system CV3 is configured for the transport of storage units from the second conveying system to said at least one order preparation zone PC, in the first transport direction.

In particular, and according to the present disclosure, the third conveying system comprises a plurality of self-guided trolleys CHR, moving about in open space on a rolling surface of the warehouse, said self-guided trolleys comprising rolling means configured to ensure movement of the self-guided trolley along a horizontal plane of the rolling surface.

"In open space" is understood to mean that the self-guided trolleys CHR, in particular the rolling means, are configured to travel on the rolling surface, namely a flat surface, without requiring guide rails on the rolling surface.

The rolling surface may typically be the floor of the warehouse, or the upper surface of a rolling-surface platform that is raised relative to the floor and substantially flat.

The rolling surface, namely the floor or the rolling-surface platform, preferably extends between order preparation stations PC and storage racks Ra, and preferably exclusively between order preparation stations PC and second conveying devices AC which are exclusively outside the storage racks and shelving aisles. In particular, self-guided trolleys CHR move about exclusively outside the storage racks and shelving aisles.

Maintenance interventions are facilitated in the event that one of the self-guided trolleys breaks down. In particular, maintenance does not require intervention from above, from below, or through the storage rack. The height of the area where the self-guided trolleys move about is not limited, compared to an alternative where the rolling surface is below the storage racks. The cumulative height of a self-guided trolley CHR and a storage unit U carried by the self-guided trolley is not height-restricted. The paths traveled by the self-guided trolleys between the order preparation stations and the second devices on a same side of the rack system are of limited length.

The rolling means comprise one or more motorized wheels. The self-guided trolleys are equipped with a mechanism for a change of direction. The change of direction may be carried out by turning the trolley, for example by controlling two motorized wheels, by controlling the two wheels according to different rotation speeds, or by reversing the direction of rotation of the wheels, meaning the trolley including its chassis changes orientation in order to obtain a change of direction. Reversing the direction of rotation of the two motorized wheels may in particular allow the self-guided trolley to pivot about a fixed vertical axis of the self-guided trolley.

According to another embodiment taught by FR3125514 (A1) of the present Applicant, the change of direction of the vehicles may be achieved by a device for pivoting and driving the wheels in relation to a chassis of the trolley, which allows the change of direction without the chassis changing orientation. Self-guided trolleys CHR may thus move in both directions of the horizontal plane, and for example in the X direction and the Y direction, while maintaining the same orientation of its chassis on the rolling surface.

The self-guided trolleys are each equipped with a communication module, configured to receive and transmit data, such as guidance instructions, wirelessly to a from a remote computerized control unit.

Said remote control unit ensures the management and control of the conveying systems, which includes managing the guide paths of the self-guided trolleys on the rolling surface in order to ensure the transport of the storage units from the locations in the storage rack to said at least one order preparation station PC, in particular while avoiding collisions of the trolleys on the rolling surface, and while coordinating them with the other conveying systems of said installation.

Figure 1:
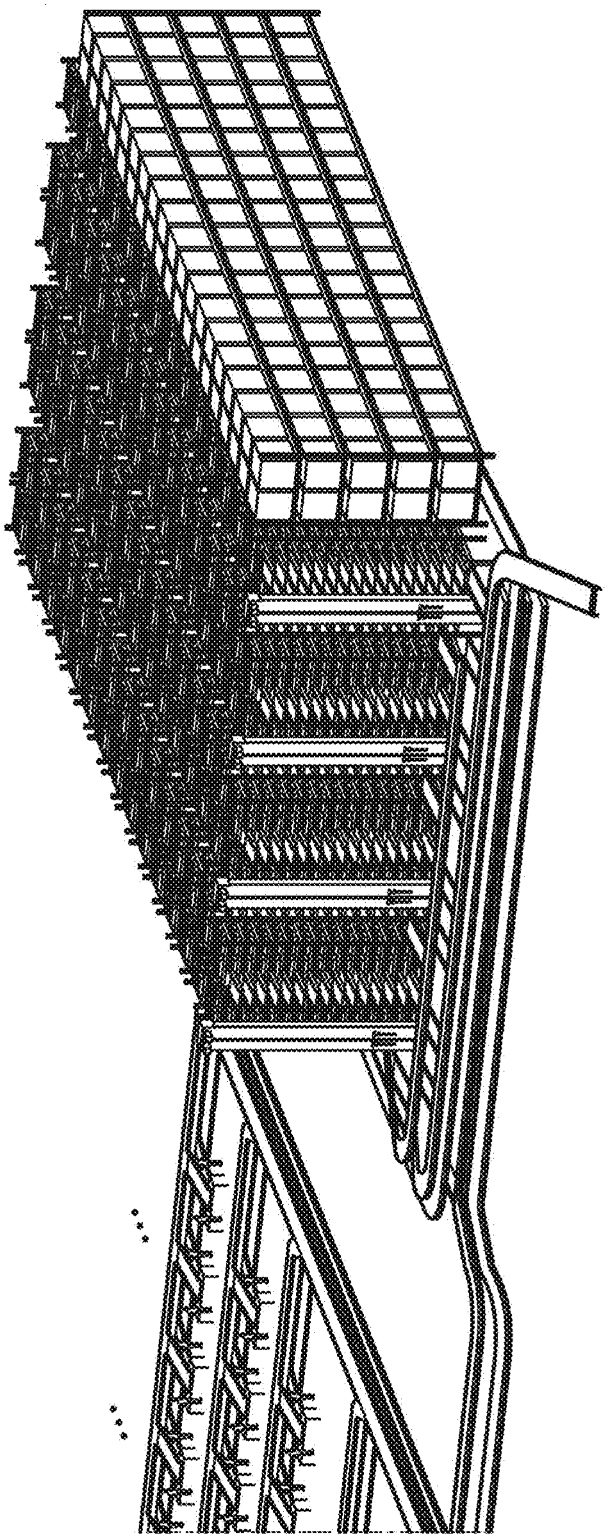
FIG. 1 shows the prior art mentioned in the introduction.

The present disclosure arose from the findings by the inventor that first conveying system CV1 and second conveying system CV2 are conveying devices which, in the event of a failure, do not cause a total shutdown of the order preparation system, but only localized shutdowns at certain parts of the storage racks associated with the failed conveying devices, and unlike the roller conveyors forming the third conveying system illustrated in FIG. 1 which constitutes a single point of failure in such prior art and can cause the order preparation system to shut down completely.

Furthermore, the present disclosure arose from the Applicant's desire to propose an order preparation system that benefits from proven reliability with regard to the first conveying system and the second conveying system, without the preparation system being affected by failures of the third conveying system.

The self-guided trolleys of the third conveying system provide a significant advancement compared to this prior art, in particular to roller conveyors, in particular by:

Eliminating the single points of failure: in the event of failure of one of the self-guided trolleys in the fleet, the control unit is configured to remotely identify the faulty trolley on the rolling surface, and to control and monitor the other self-guided trolleys in order to continue the order preparation operations while avoiding collisions with the faulty self-guided trolley, Possibly implementing a control strategy authorizing a transport of storage units, in an order that is modified in comparison to the sequential order of the storage units transported by second conveying devices AC, and in particular timing strategies, enabled by the self-guided trolleys which are independent of each other, Total physical decoupling between, on the one hand, second conveying devices AC which move vertically and ensure the raising/lowering of the storage units, and on the other hand, the order preparation stations which are typically at least 2 in number, Ease in increasing the capacity of the order preparation system, namely the average number of orders per unit of time, simply by adding additional self-guided trolleys on the rolling surface, and preferably without any other physical modification to the rolling surface of the order preparation system, or even by possibly adding additional order preparation stations, Use of self-guided trolleys which travel solely on the rolling surface, meaning they are simple and not very powerful compared to self-guided trolleys which comprise climbing means such as those known for example from document FR 3 125 516 which do indeed allow not only horizontal movement but also vertical movement of the self-guided trolley, but consume much more energy in order to lift the storage units in the storage racks: in contrast and according to the present disclosure, the function of lifting the storage units in the storage racks is left to second conveying devices AC which typically run on wired electrical power. The structure of the self-guided trolleys is simplified; in particular the batteries of self-guided trolleys may be of reduced capacity compared to that of a trolley equipped with such climbing means.

Generally, at least according to one embodiment, said at least one control station comprises several independent control stations PC, accessible by the self-guided trolleys via the rolling surface, and said at least one second conveying device comprises several independent second conveying devices AC, respectively associated with several shelving aisles, respectively serving the different storage racks by the respective shelving aisles.

The rolling surface and the self-guided trolleys are configured to supply each of the order preparation stations PC from storage units which come from various second conveying devices AC.

According to one embodiment, the order preparation system comprises a (second) transfer system configured to ensure, on the one hand, a transfer of storage unit U, in the first transport direction, from said at least one second conveying device AC, which is therefore in a low position, to one of self-guided trolleys CHR parked in at least one transfer location PT1, PT2 near second conveying device AC, and configured to ensure, on the other hand, a transfer of the storage unit, in the second transport direction, from one of the self-guided trolleys parked in said at least one transfer location PT1, PT2, to second conveying device AC.

Figure 4:
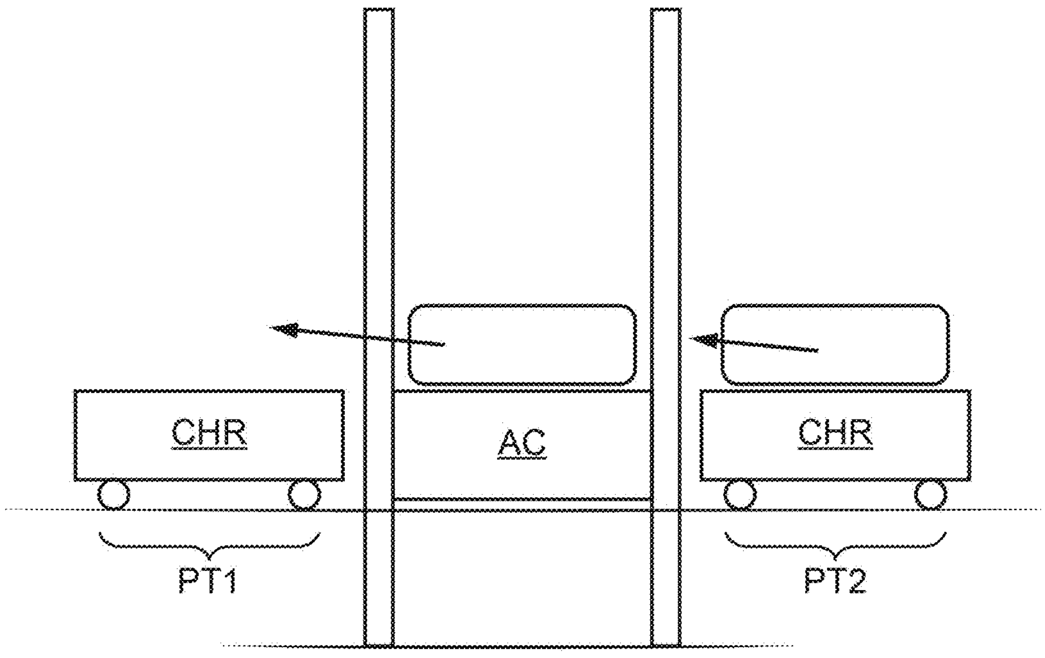
FIG. 4 is a detailed schematic view of a second conveying device in a low position, at the level of the rolling surface or near the rolling surface, transporting a storage unit on a support, a first self-guided trolley being parked on the rolling surface at a first transfer location to enable a first transfer of the storage unit from the second conveying device to the first self-guided trolley, in the first transport direction for transporting the storage unit from the rack to the order station, a second trolley carrying another storage unit being parked on the rolling surface at a second transfer location to enable a second transfer of said other storage unit from the self-guided trolley to the second conveying device, in the second transport direction for transporting the storage unit from the order preparation station to the storage rack.
Figure 5:
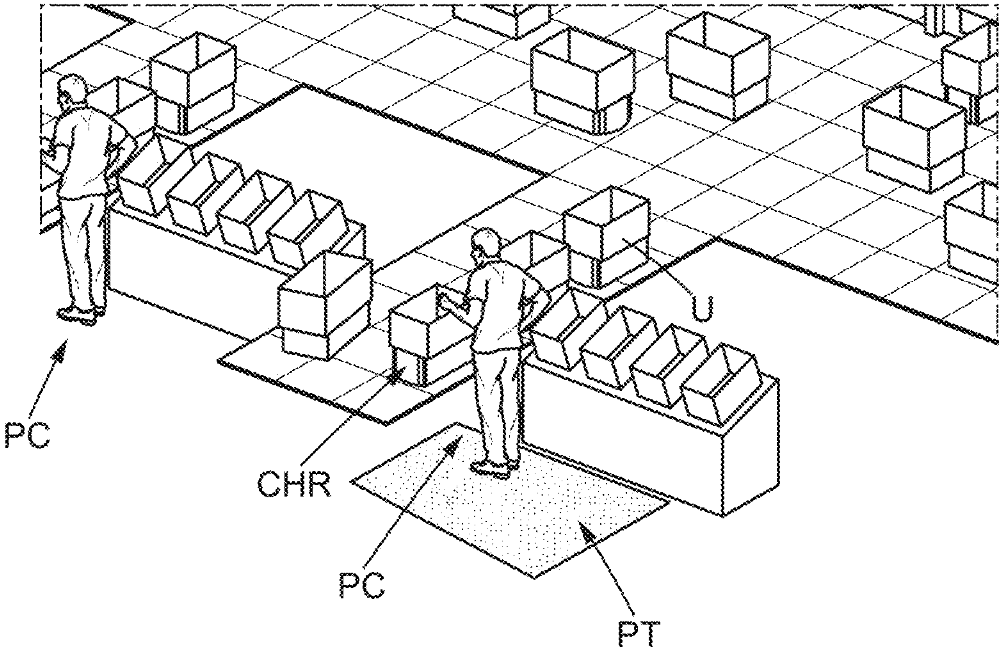
FIG. 5 is a view of an alternative to FIG. 4 in which the operator present at the order preparation station is on a platform comprising a height-adjustable mechanism, illustrating the rolling surface which is the rolling-surface platform, raised relative to the support surface on which the operator works, the raised height of the rolling-surface platform offering improved ergonomics for the operator when collecting items from a storage unit carried by the self-guided trolley parked at the edge of the rolling-surface platform.

According to at least one embodiment illustrated in said FIG. 4, said at least one transfer location comprises a first transfer location PT1 and a second transfer location PT2, the two locations being arranged one on either side of second conveying device AC which is in said low position.

Advantageously, according to the embodiment illustrated in FIG. 4, said transfer system may be configured to perform, selectively:

a transfer of the storage unit between second conveying device AC, which is in the low position, and a first self-guided trolley among said self-guided trolleys which is parked in the first transfer location PT1, in particular in the first transport direction (or respectively in the second transport direction), a transfer of the storage unit between second conveying device AC, which is in the low position, and a second self-guided trolley among said self-guided trolleys which is parked in the second transfer location PT2, in particular in the second transport direction (or respectively in the first transport direction).

Having two transfer locations for the two self-guided trolleys advantageously makes it possible to limit the time that second conveying device AC is immobilized in said low position, by unloading the storage unit from conveying device AC to the first trolley at the first transfer location PT1 and then loading second conveying device AC from the second motorized trolley parked in said second location.

The two transfers from the two locations are carried out without any loss of time due to movement of the second motorized trolley, and in comparison to two transfers carried out from only one transfer location which requires moving the first trolley after its loading in order to allow unloading the second trolley.

According to one embodiment, the transfer system may be carried on board said at least one second conveying device AC, and comprises a laterally movable portion configured to deploy storage unit U from a first position in which storage unit U is carried by a support of second conveying device AC, to a lateral cantilevered position on the support in which said storage unit is moved to above one of the self-guided trolleys parked in said at least one transfer location PT1, PT2.

According to one embodiment, the rolling surface may simply be the floor of the warehouse, in particular a floor such as a concrete slab on which rest the storage racks Ra of the order preparation system.

According to another embodiment, the rolling surface is a rolling-surface platform which is raised, in whole or in part, relative to:

a floor of the warehouse on which the storage racks rest, and in particular such that vertical guide rails of said at least one second device AC extend lower than the level of the rolling-surface platform, and/or a support surface, such as the floor, for an operator of the order preparation station, such that a portion of the edge of the platform, adjoining the support surface for the operator, allows parking one of self-guided trolleys CHR carrying a storage unit U, in a raised manner relative to the support surface.

Such an embodiment is in particular illustrated in the embodiment of FIGS. 2 to 5 which illustrates an embodiment where the rolling-surface platform is raised in its entirety, relative to the floor of the warehouse, in particular from the order preparation stations to said at least one transfer location at second conveying device AC, preferably in a zone that does not include the storage racks and the shelving aisles between the racks.

The rolling surface of the rolling-surface platform may be at a height relative to the floor of between 600 mm and 800 mm.

The rolling-surface platform may provide a (first) advantage in improving the work ergonomics at said at least one order preparation station, and in particular the order preparation stations, arranged at the edge of the rolling-surface platform. For this purpose, the rolling-surface platform is raised relative to a support surface for an operator of order preparation station PC, such that a portion of the edge of the rolling-surface platform, adjoining the support surface, allows parking one of self-guided trolleys CHR carrying a storage unit, in a raised manner relative to the support surface.

The support surface may be the floor of the warehouse or possibly a platform PT comprising in particular a height adjustment mechanism configured to allow adjusting a difference in level between the rolling-surface platform and platform PT. Such an adjustment mechanism may comprise for example manual systems such as screw/nut, or electric such as electric actuators, to change the level of platform PT relative to the ground.

Thus, advantageously, when collecting items in the storage unit carried by the self-guided trolley at the edge of the rolling-surface platform, the higher position of the trolley relative to the support surface of the operator advantageously allows the operator to collect the items without having to bend into an uncomfortable position.

The various order preparation stations may preferably have individual adjustment mechanisms, making it possible to adapt the ergonomics of each station to the different operators of the order preparation stations.

In general, the rolling-surface platform may have a rolling surface formed by a coating ensuring a static coefficient μ with the rolling means of the self-guided trolleys that is greater than or equal to 0.3, or even greater than or equal to 0.4, or even greater than or equal to 0.5, or even greater than or equal to 0.6. The risks of the wheels slipping on the rolling surface are advantageously reduced.

In general, the position of the self-guided trolleys may be determined by using one or more encoder(s) targeting the rotation of the motorized wheels, and typically also by using optically detected ground markers, or even by using LiDAR. In the event of wheel slippage, this may cause an inconsistency between the encoder measurement and the actual position of the trolley, and in some cases, may cause the locator system to malfunction and shut off. Having a rolling surface with a controlled friction coefficient limits the risk of slippage, and thus the occurrence of these untimely shutdowns, regardless of the quality of the floor of the warehouse in which the order preparation system is installed.

The rolling-surface platform may provide the (second) advantage of facilitating the level adjustment between the self-guided trolley in said at least one transfer location PT1, PT2, and second conveying device AC in the low position, because the self-guided trolleys are raised above the floor. Such level adjustment facilitates transfers of the storage unit between second conveying device AC and said self-guided trolley, preferably in the first transport direction or in the second transport direction, via (simple) horizontal movements.

The present disclosure also relates to a method for preparing at least one order comprising one or more items, which makes use of an order preparation system according to the present disclosure.

The order preparation method may thus comprise:

- /A/ selecting one or more storage units U among the storage units received in the racks, said storage unit(s) containing the item(s) of said at least one order,
- /B/ transporting said selected storage unit(s) to said at least one order preparation zone along the first transport direction, by:
  - /B0/ transferring the storage unit from a storage location in the rack to one of first conveying devices SH
  - /B1/ conveying said unit to the second conveying system via horizontal transport by moving first conveying device SH,
  - /B2/ transferring the storage unit from first conveying device SH to second conveying device AC,
  - /B3/ conveying said storage unit via vertical transport by moving second conveying device AC to a low position,
  - /B4/ transferring the storage unit from the second conveying device to one of the self-guided trolleys,
  - /B5/ conveying said storage unit to said at least one order preparation zone PC, by moving self-guided trolley CHR in the open space.

Conversely, the conveying facility may carry out, in the second transport direction, the restocking of storage racks with storage units containing items.

The present disclosure may further provide a restocking method, comprising:

- /a/ filling one or more storage units with items,
- /b/ transporting said storage unit(s) filled with items to one or more storage locations in the storage racks along the second transport direction, by:
  - /b0/ conveying said storage unit to the second conveying system, by moving self-guided trolley CHR in the open space,
  - /b1/ transferring the storage unit from the self-guided trolley to second conveying device AC which is in the low position,
  - /b2/ conveying said storage unit via vertical transport by moving second conveying device AC from said low position to the level of an empty storage location in the storage rack,
  - /b3/ transferring said storage unit from said second storage device to one of the first adjacent conveying devices,
  - /b4/ conveying said unit to said empty storage location via horizontal transport by moving first conveying device SH,
  - /b5/ transferring said storage unit from the first conveying device to said empty storage location in said storage rack.

According to one embodiment, in /B4/ the transfer of the storage unit to said self-guided trolley takes place while said trolley is parked in first transfer location PT1 and while another of the self-guided trolleys carrying another storage unit is parked in second transfer location PT2.

The method may then successively comprise, in /B4/, the transfer of said other storage unit from second transfer location PT2 to the second conveying device held in the low position, and a return of said other storage unit to one of the storage locations of the rack by conveying second conveying device AC via vertical transport, followed by conveying one of first conveying devices SH via horizontal transport.

For this purpose, said system comprising the (first) transfer system carried on board first conveying device SH or the (second) transfer system carried on board the second conveying device, is configured to ensure a transfer of storage unit U from first conveying device SH to second conveying device AC.

According to one embodiment, and according to an advantageous control strategy, the use of self-guided trolleys makes it possible to implement a timing strategy.

According to one embodiment, said order preparation method may comprise a plurality of orders being prepared, the method comprising

- /C/ computerized identification of common items among the orders being prepared, these items being contained in a storage unit common to said orders being prepared, including a first order and an order subsequent to the first order, and after conveyance according to /B5/ by the self-guided trolley carrying the common storage unit to an order preparation zone for preparation of the first order
- /D/ placing the self-guided trolley carrying the common storage unit on hold in a waiting area arranged in or near the preparation area, without returning the storage unit to the storage rack, so as to free said preparation area to receive at least one other storage unit conveyed according to /B5/ by another of the self-guided trolleys, said at least one other storage unit being necessary for the preparation of the first order or even of a second order,
- /E/ returning the self-guided trolley carrying said common storage unit, from the waiting area to the order preparation zone, for preparation of the subsequent order.

In general, the self-guided trolleys are each equipped with the communication module configured to receive data and send data wirelessly to and from said computerized remote control unit.

Said remote control unit ensures the management and control of the conveying systems, which includes managing the guide paths of the self-guided trolleys on the rolling surface in order to ensure the transport of a storage unit from a location in the storage rack to said at least one order preparation station PC.

Said control unit comprises one or more processors, a memory, and a set of instructions configured for implementing the order preparation method, and in particular:

steps /A/ and /B/, including /B0/, /B1/, B/2/, /B/3/, /B4/ and /B5/, of the order preparation method, or even steps /C/, /D/ and /E/, and /or steps /b0/, /b1/, /b2/, /b3/, /b4/ and /b5/ of the restocking method.

This disclosure also relates to a computer program comprising instructions which, when said program is executed by a control unit comprising a processor and a memory, ensures the implementation of the order preparation method and in particular:

steps /A/ and /B/, including /B0/, /B1/, B/2/, /B/3/, /B4/ and /B5/, of the order preparation method, or even steps /C/, /D/ and /E/, and /or steps /b0/, /b1/, /b2/, /b3/, /b4/ and /b5/ of the restocking method.

This disclosure also relates to a non-transitory computer-readable storage medium on which the computer program is stored.

Abbreviations

Ra. Storage rack
CV1. First conveying system
CV2. Second conveying system
CV3. Third conveying system
SH. First conveying devices
AC. Second conveying devices
PC. Order preparation station
CHR. Self-guided trolleys
PT1, PT2. First and second transfer location, respectively
PT. Platform (operator)
U. Storage units

The invention claimed is:

1. An order preparation system comprising, in a warehouse:

a plurality of racks (Ra) each configured to receive storage units (U) intended for items, the racks being arranged in a plurality of vertical planes, at least one order preparation zone (PC) arranged at a distance from the racks, a conveying facility configured to transport one or more storage units received in the racks to said at least one order preparation zone, in a first transport direction, or conversely to transport one or more storage units from the order preparation zone to the racks, in a second transport direction, said conveying facility successively comprising, along the first transport direction:

a first conveying system (CV1) which is arranged in a shelving aisle arranged between two adjacent racks, configured to transport storage units (U) from at least one of the two racks comprising several first conveying devices (SH) arranged at a plurality of heights, said first devices being independent of each other for the horizontal transport of storage units along said shelving aisle, a second conveying system (CV2), comprising at least one second conveying device (AC) configured for the vertical transport of storage units from the first conveying device to a third conveying system, in the first transport direction, the third conveying system (CV3), configured for the transport of storage units from the second conveying system to said at least one order preparation zone (PC), in the first transport direction, and wherein the third conveying system comprises a plurality of self-guided trolleys (CHR) circulating in open space on a rolling surface of the warehouse, said self-guided trolleys comprising rolling means configured to ensure movement of the self-guided trolley along a horizontal plane of the rolling surface.

2. The order preparation system according to claim 1, wherein the rolling surface is a rolling-surface platform which is raised relative to:

a floor of the warehouse on which the racks rest, such that vertical guide rails of said at least one second conveying device extend lower than the height of the rolling-surface platform, and a support surface, such as the floor, for an operator of the order preparation station, such that a portion of the edge of the platform, adjoining the support surface for the operator, allows parking one of the self-guided trolleys (CHR) carrying a storage unit (U), in a raised manner relative to the support surface.

3. The order preparation system according to claim 2, wherein the support surface is a platform (PT) comprising a height adjustment mechanism configured to allow adjusting a difference in level between the rolling-surface platform and the platform.

4. The order preparation system according to claim 1, comprising a transfer system configured to ensure, on the one hand, a transfer of the storage unit (U), in the first transport direction, from said at least one second conveying device (AC) which is therefore in a low position, to one of the self-guided trolleys (CHR) parked in at least one transfer location (PT1, PT2) near the second conveying device (AC), and configured to ensure, on the other hand, a transfer of the storage unit, in the second transport direction, from one of the self-guided trolleys parked in said at least one transfer location (PT1, PT2), to the second conveying device (AC).

5. The order preparation system according to claim 4, wherein said at least one transfer location comprises a first transfer location (PT1) and a second transfer location (PT2), arranged one on either side of the second conveying device (AC) which is in said low position, and wherein said transfer system is configured to perform, selectively:

a transfer of the storage unit between said second conveying device (AC), in the low position, and a first self-guided trolley among said self-guided trolleys which is parked in the first transfer location (PT1), in particular in the first transport direction or respectively in the second transport direction, a transfer of the storage unit between said second conveying device (AC), in the low position, and a second self-guided trolley among said self-guided trolleys which is parked in the second transfer location (PT2), in particular in the second transport direction or respectively in the first transport direction.

6. The order preparation system according to claim 4, wherein the transfer system is carried on board said at least one second conveying device (AC) and comprises a laterally movable portion configured to deploy the storage unit (U) from a first position in which said storage unit (U) is carried by a support of the second conveying device (AC), to a lateral cantilevered position on the support in which said storage unit is moved to above one of the self-guided trolleys parked at said at least one transfer location (PT1, PT2).

7. The order preparation system preparation system according to claim 1, wherein:

said at least one control station comprises several independent control stations (PC) which are accessible by the self-guided trolleys via the rolling surface, said at least one second conveying device comprises a plurality of independent second conveying devices (AC) which are respectively associated with a plurality of shelving aisles, respectively serving the different racks, and the rolling surface and the self-guided trolleys are configured to supply each of the order preparation stations (PC) from storage units coming from various different second conveying devices (AC).

8. The order preparation system according to claim 1, wherein the second conveying devices (AC) are exclusively positioned outside the shelving aisles and outside the storage racks.

9. The order preparation system according to claim 8, wherein said at least one second conveying device (AC) comprises, for each shelving aisle, a second conveying device (AC) associated with the first conveying devices (SH) of said aisle, said second conveying device (AC) configured to travel vertically and being positioned outside said shelving aisle, preferably offset laterally relative to said shelving aisle in a direction transverse to said shelving aisle, and wherein each first conveying device is configured to travel in said aisle to a position outside said shelving aisle, where said first conveying device (SH) is positioned adjacent to the second conveying device (AC), in a transfer position, and wherein the order preparation system comprises a transfer system carried on board said first conveying device (SH) or said second conveying device (AC), configured to allow a transfer of said storage unit (U) from the first conveying device (SH) which is then in said transfer position, to the second conveying device (AC), in the first transport direction.

10. The order preparation system according to claim 8, wherein the rolling surface, in particular the floor or the rolling-surface platform, extends between the order preparation stations (PC) and the storage racks (Ra), exclusively between the order preparation stations (PC) and the second conveying devices (AC) which are exclusively outside the storage racks (Ra) and the shelving aisles, and such that the self-guided trolleys (CHR) are configured to circulate exclusively outside the storage racks (Ra) and the shelving aisles.

11. An order preparation method for preparing at least one order comprising one or more items, making use of an order preparation system according to claim 1, the method comprising:

/A/ selecting one or more storage units (U) among the storage units received in the racks, said storage unit(s) containing the item(s) of said at least one order, /B/ transporting said selected storage unit(s) to said at least one order preparation zone in the first transport direction, by:

/B0/ transferring the storage unit from a storage location in the rack to one of the first conveying devices (SH), /B1/ conveying said unit via horizontal transport to the second conveying system by moving the first conveying device (SH), /B2/ transferring the storage unit from the first conveying device (SH) to the second conveying device (AC)

/B3/ conveying said storage unit via vertical transport by moving the second conveying device (AC) to a low position, /B4/ transferring the storage unit from the second conveying device to one of the self-guided trolleys, /B5/ conveying said storage unit to said at least one order preparation zone (PC), by moving the self-guided trolley (CHR) in the open space.

12. The order preparation method according to claim 11, wherein, in /B4/, the transfer of the storage unit to said self-guided trolley takes place while said trolley is parked in said first transfer location (PT1), and while another of the self-guided trolleys carrying another storage unit is parked in the second transfer location (PT2), the method successively comprising, in /B4/, the transfer of said other storage unit from the second transfer location (PT2) to the second conveying device held in the low position, and a return of said other storage unit to one of the receiving locations of the rack by conveying the second conveying device (AC) via vertical transport, followed by conveying one of the first conveying devices (SH) via horizontal transport, said system comprising a transfer system, carried on board the first conveying device (SH) or second conveying device (AC), configured to ensure a transfer of the storage unit (U) from the first conveying device (SH) to the second conveying device (AC).

13. The order preparation method according to claim 11, comprising a plurality of orders currently being prepared, the method comprising /C/ computerized identification of common items among the orders being prepared, these items being contained in a storage unit common to said orders being prepared which include a first order and an order subsequent to the first order, and after conveyance according to /B5/ by the self-guided trolley carrying the common storage unit to an order preparation zone for preparation of the first order, /D/ placing the self-guided trolley carrying the common storage unit on hold in a waiting area arranged in or near the preparation area, without returning the storage unit to the rack, so as to free said preparation area to receive at least one other storage unit conveyed according to /B5/ by another of the self-guided trolleys, said at least one other storage unit being necessary for the preparation of the first order or even of a second order, /E/ returning the self-guided trolley carrying said common storage unit, from the waiting area to the order preparation zone, for preparation of the subsequent order.

14. The order preparation system according to claim 1, wherein the self-guided trolleys are each equipped with a communication module configured to receive and send data wirelessly to and from a computerized remote control unit, and wherein said remote control unit ensures the management and control of the conveying systems, which includes managing the guide paths of the self-guided trolleys on the rolling surface in order to ensure the transport of a storage unit from a storage location in the storage rack to said at least one order preparation station (PC), said control unit comprising one or more processors, a memory, and a set of instructions configured for implementing an order preparation method.

* * * * *